(12) United States Patent
Iordache-Sica

(10) Patent No.: US 12,494,965 B1
(45) Date of Patent: Dec. 9, 2025

(54) KUBERNETES-DRIVEN CONTROL OF NETWORK HARDWARE SYSTEMS

(71) Applicant: Arista Networks, Inc., Santa Clara, CA (US)

(72) Inventor: Mircea-Mihai Iordache-Sica, Glasgow (GB)

(73) Assignee: ARISTA NETWORKS, INC., Santa Clara, CA (US)

( * ) Notice: Subject to any disclaimer, the term of this patent is extended or adjusted under 35 U.S.C. 154(b) by 47 days.

(21) Appl. No.: 18/736,237

(22) Filed: Jun. 6, 2024

(51) Int. Cl.
   *H04L 41/082* (2022.01)
   *H04L 41/0816* (2022.01)
   *H04L 47/125* (2022.01)

(52) U.S. Cl.
   CPC ........ *H04L 41/082* (2013.01); *H04L 41/0816* (2013.01); *H04L 47/125* (2013.01)

(58) Field of Classification Search
   CPC ... H04L 41/082; H04L 41/0816; H04L 41/06; H04L 41/08; H04L 47/125
   USPC ...................................................... 709/220
   See application file for complete search history.

(56) References Cited

U.S. PATENT DOCUMENTS

| | | | | |
|---|---|---|---|---|
| 10,779,178 | B1 * | 9/2020 | Ramanathan | H04W 8/04 |
| 11,936,548 | B2 * | 3/2024 | Wennerström | H04L 41/5019 |
| 2021/0109734 | A1 * | 4/2021 | Vittal | G06F 11/1433 |
| 2022/0158926 | A1 * | 5/2022 | Wennerström | H04L 43/20 |
| 2024/0015136 | A1 * | 1/2024 | Asveren | G06F 9/45558 |
| 2025/0247289 | A1 * | 7/2025 | Zhong | H04L 41/0813 |

FOREIGN PATENT DOCUMENTS

| | | | | | |
|---|---|---|---|---|---|
| CN | 114296909 | A | * | 4/2022 | |
| CN | 117851182 | B | * | 11/2024 | G06F 11/3089 |
| WO | WO-2022104396 | A9 | * | 7/2022 | H04L 43/50 |

OTHER PUBLICATIONS

Network Load Balancing on Amazon EKS, at https://docs.aws.amazon/eks/latest/userguide/network-load-balancing.html, Amazon, 2024, 12 pgs.

LoadBalancer Service concepts, at https://cloud.google.com/kubernetes-engine/docs/concepts/service-load-balancer, Google, last updated Jun. 3, 2024, 13 pgs.

MetalLB, Bare metal load-balancer for Kubernetes, at https://metallb.universe.tf/, Cloud Native Computing Foundation and The Linux Foundation, 2021, 3 pgs.

* cited by examiner

*Primary Examiner* — Ruolei Zong
(74) *Attorney, Agent, or Firm* — Sprinkle IP Law Group

(57) ABSTRACT

Systems and methods for Kubernetes-cluster-driven modification of network hardware configuration. A Kubernetes event is detected in received network traffic and the corresponding packet is examined to identify a pod of a Kubernetes cluster, then the packet is forwarded to the pod for processing. The pod determines a configuration modification of a network hardware element (e.g., a load balancing switch) based on the processing of the event. The pod sends the modification to a controller, which then generates a command (e.g., an API call or CLI command) and sends this command to the network hardware element to implement the desired modification. The configuration of the network element is then updated according to the command received from the controller.

20 Claims, 6 Drawing Sheets

KUBERNETES-DRIVEN CONTROL OF NETWORK HARDWARE SYSTEMS

TECHNICAL FIELD

The disclosed embodiments relate generally to the acceleration of network hardware features, and more particularly to providing a Kubernetes or similar architecture that enables Kubernetes services to interact with network elements to affect the functions of the network elements without requiring human intervention.

BACKGROUND

Design of information applications over the years has evolved from monolithic systems to operation in distributed environments. Distributing applications involves modularizing the applications to allow them to operate within data centers. The distribution of applications allows the applications to achieve scalability for handling dynamic loads. Distribution of the applications, and improving fault tolerance from hardware failures. This shift in application design is driven by the Internet of Things (IoT), sixth generation (6G) wireless communications, Artificial Intelligence (AI), and ever-growing cloud and data center deployments, has led to the widespread adoption of DevOps (a methodology in the software development and IT industry for integrating and automating the work of software development and IT operations) and advanced management and orchestration frameworks to shorten and automate the development lifecycle.

The Kubernetes software architecture has become the industry-standard framework for service management and orchestration. This is a result of the evolution of information applications toward operation in distributed environments. Kubernetes modularizes information applications, achieving scalability that facilitates dynamic loads, and improves fault tolerance from hardware failures.

Kubernetes has been used in networking, but it is application-driven and has conventionally been used in networking in the form of software implementations of Container Networking Interface (CNI) plugins, which have performance limitations. There have been no implementations of the Kubernetes architecture which enable a Kubernetes cluster to influence the external world (e.g., to control components of a physical networking infrastructure).

The previously realized benefits of the Kubernetes architecture are achieved within the software realm, and merely inform conventional (e.g., manual) control of networking hardware. For example, an application implemented in a Kubernetes architecture may provide information which is useful to determine load balancing in a network, but the physical hardware of the network must still be manually configured (e.g., by a user providing Command Line Interface (CLI) commands to a network device) to implement the desired load balancing.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
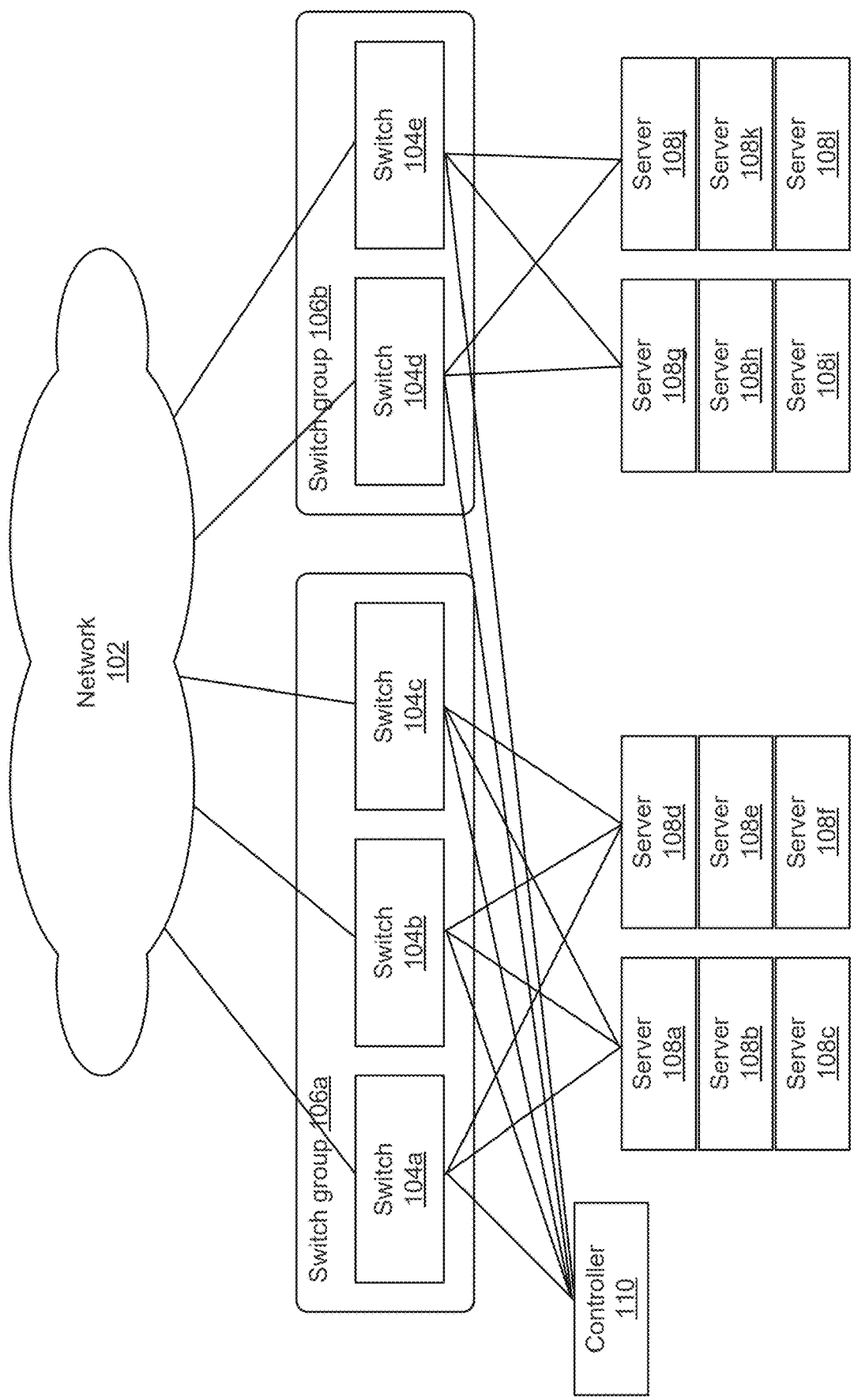
FIG. 1 is a diagram illustrating a representative network topology in which disclosed embodiments may be implemented.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The disclosed embodiments for Kubernetes integration accelerate network functions such as load balancing by integrating the software processes that are implemented using the Kubernetes architecture with hardware networking appliances. More specifically, the disclosed embodiments use a hardware accelerated Kubernetes architecture to enable a Kubernetes controller to detect Kubernetes events, process the events to determine desired hardware changes, and then generate API calls to the hardware networking appliances to directly implement the desired changes in the network appliances.

In an example embodiment, a network switch is connected to a network to receive network traffic. The network switch is also connected to a set of servers, where received network traffic is routed by the network switch to appropriate ones of the servers. The system includes a controller that runs on one of the servers connected to the network switch, and which is configured to receive API calls that effect configuration changes in the network switch.

One or more of the servers connected to the network switch have instances of a service running on them, where the service instances are running under a Kubernetes architecture. When network traffic is received by the network switch, the traffic is monitored to detect Kubernetes events.

The detected events are compared to match rules in order to determine a particular Kubernetes pod to which the event should be routed for processing. These pods include a specific pod that handles events relating to configuration of the switch (e.g., events that affect load balancing performed by the switch.) Based on the processing of the event, the Kubernetes pod may determine that a change should be made to the configuration of the network switch, in which case the pod generates an API call to an API server of the Kubernetes control plane. The API server then generates configuration commands (e.g., CLI commands) which are input to the switch to update its configuration.

The disclosed Kubernetes architecture thereby enables network hardware components (e.g., load-balancing switches) to be configured automatically in response to detected Kubernetes events, rather than simply providing information to a user who must then manually configure the hardware components. The ability of the disclosed architecture to avoid user intervention in the configuration of the network hardware allows it to achieve the same configuration updates as conventional architectures in a manner that is faster and more efficient than conventional architectures.

The disclosed Kubernetes architecture will be described in more detail below. Referring to FIG. 1, a diagram is shown to illustrate a representative network topology in which disclosed embodiments may be implemented. As shown in this figure, a plurality of network switches 104a-104e are connected to a network fabric 102. Switches 104a-104e may be configured as (one or more) switch groups, where each of the switches in a logical switch group is redundant, and each of the switches in the logical switch group mirrors the same configuration. In the representative topology of FIG. 1, a first switch group 106a includes three switches (104a-104c), and a second switch group 106b includes two switches (104d 104e).

Although only two switch groups (106a, 106b) are depicted in the figure, there may be more or fewer switch groups in other embodiments. Similarly, although only five switches (104a-104e) are shown in the figure, there may be more or fewer switches (in total or in individual switch groups) in other embodiments.

It should be noted that different instances of the same or similar components, groups, etc. may be identified herein by a common reference number followed by a letter. For instance, as depicted in FIG. 1, the representative topology includes switches 104a-104n. The components may be referred to individually by the number and letter (e.g., switch 104a, or they may be referred to generically or collectively by the number alone (e.g., switches 104).

Each switch group 106 serves as a Top-of-Rack switch (TOR) that is connected to a plurality of hardware servers or other processors 108. In this example, switch group 106a is connected to a set of servers 108a-108f, while switch group 106b is connected to a set of servers 108g-108l. Again, although the figure shows a specific number of servers connected to each of the switch groups, other embodiments may have more or fewer servers connected to each switch group.

The switches 104 may be used to provide load balancing of network traffic between multiple pod replicas that belong to a specified Kubernetes service deployment. The switches may therefore be deployed with a stateless load-balancer profile and management http-commands enabled. Configuration of the switches' load balancer profile state is performed in the disclosed embodiments using eAPI commands that are issued by the Kubernetes pods.

The system of FIG. 1 includes a controller 110 that enables control of switches 104 by the Kubernetes pods. Controller 110 executes on a master node. The master node may reside on one of servers 108, but is shown separately in the figure for clarity.

Controller 110 is a special controller pod that is responsible for ensuring synchronization between the Kubernetes cluster state and the switch configurations. The controller's design includes two distinct aspects: one for monitoring Kubernetes events; and one for managing the switches.

Controller 110 includes a custom resource that handles the monitoring of Kubernetes events as well as the managing of switches 104 by issuing eAPI commands to the switches to update their configurations (e.g., their load balancer profiles). The custom resource is part of the Kubernetes control plane, and will monitor Kubernetes service and pod creation, update, and deletion events that affect the underlying topology. The custom resource is configured to, upon detection of changes in the Kubernetes cluster, issue eAPI commands to the switches to update the configuration of the load balancer profile.

Figure 2:
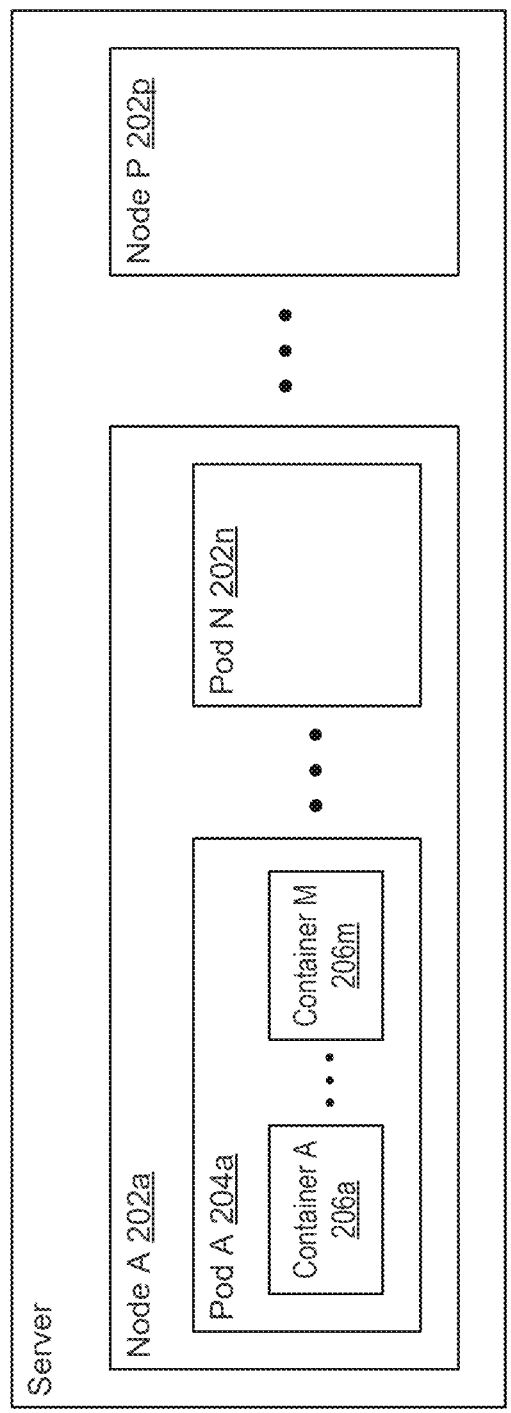
FIG. 2 is a diagram illustrating the relationship of Kubernetes nodes and pods running on the servers in accordance with some embodiments.

Referring to FIG. 2, a diagram is shown to illustrate the relationship of Kubernetes nodes and pods running on the servers in some embodiments. As depicted in this figure, each server may have one or more nodes 202 thereon. The nodes on the various servers may collectively form a Kubernetes cluster. Each node 202 may contain one or more Kubernetes pods 204, and each Kubernetes pod may include one or more Kubernetes containers 206.

The Kubernetes cluster may, for example, consist of a Kubernetes environment with non-encapsulating (MACVLAN) CNI. The cluster is serviced by two or more switches (optionally, in Multi-chassis Link Aggregation Group (MLAG) configuration), with each connecting to multiple Kubernetes nodes. Each Kubernetes node has a direct connection to each of the one or more switches. A typical deployment of the Kubernetes cluster consists of 100 pods hosted on a node and up to 100 nodes within the cluster.

Figure 3:
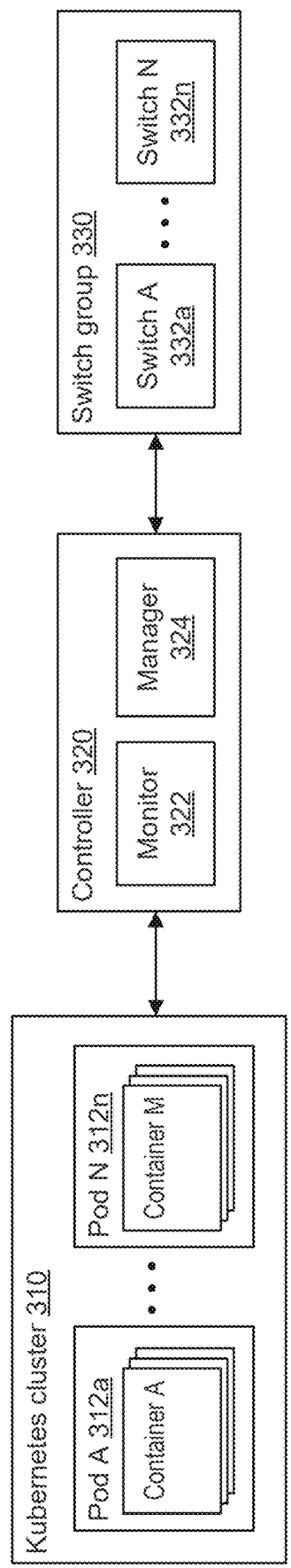
FIG. 3 is a high level diagram illustrating the interactions between the Kubernetes controller, the Kubernetes cluster and the switches that are managed by the controller in accordance with some embodiments.

Referring to FIG. 3, a diagram is shown to illustrate, at a high level, the interactions between the Kubernetes controller, the Kubernetes cluster and the switches that are managed by the controller in accordance with some embodiments. As depicted in this figure, controller 320 includes a monitor 322 and a switch manager 324. Controller 320 is in communication with switches (e.g., switch group 330 or switches 332) so that monitor 322 can monitor network traffic from the switches, and so that switch manager 324 can send API commands to update the configuration of the switches. Controller 320 is in communication with Kubernetes cluster 310 so that the controller can forward network traffic corresponding to Kubernetes events to appropriate ones of Kubernetes pods 312, and so that the controller 320 can receive Kubernetes state information that can result in the controller 320 issuing API commands to update the configuration of the switches.

The monitor component of the controller is responsible for monitoring the state of the Kubernetes cluster, pods and service events, and allocation of pods to nodes. The monitor 322 may subscribe to Kubernetes events using a Kubernetes informer construct, which regularly receives events from a Kubernetes key-value store, and maintains a copy of the state in local memory.

The Kubernetes monitor uses an internal data store that tracks service IPs and pod IP assignments and pod hosting information. The use of this data structure ensures that duplicate (e.g., reconciliation) or out-of-order events are being treated in an idempotent fashion, such that load-balancing profiles are not duplicated unnecessarily on any given switch, which would limit the scalability of the system.

The event handler for Kubernetes service events tracks details regarding the service, such as service IP assignment, associated pods and pod allocations. These details are recorded into the internal data store for the switch manager to use for operations. In regard to pod events, the handler is responsible for responding to granular changes (e.g., individual pod restart, migration, etc.) within the cluster, which are independent of the entire service.

The manager component 324 of the controller 320 is responsible for the management of the switch load balancer profiles, reflecting the assignments between service IPs and pod IPs, and routing information for each switch. The manager 324 may communicate with the switches through an eAPI client.

Since the Kubernetes cluster 310 can have more than one switch servicing it, the controller 320 assigns each set of redundant switches 332 in a logical switch group 330, mirroring the configuration onto each individual switch within the group. The cluster may contain multiple switch groups to increase service scalability. In order to dynamically detect switch group assignments and to minimize the need for manual configuration, the manager uses network topology information to correctly identify switches and perform switch group assignments. This topology information is generated using the switch LLDP neighborhood information from each switch being managed. The groups are identified based on the common connections, and an internal representation of this state within the controller is created.

It should be noted that the management IPs for the switches are known beforehand through the specification for the custom resource in order to begin the topology generation upon first connection to the switch. The switch management IPs are thus part of the Kubernetes custom resource definition and are passed to the manager of the controller during startup. The switch management IPs are then updated as the configuration is updated in response to Kubernetes events.

In terms of load-balancing profile management, each switch group 330 may be logically treated as a single switch. Profile and routing updates are generated and transmitted to the switch group 330 by reacting to update events from the monitor component 322 of the controller 320. To ensure load-balancing optimality, the switch operations are designed to be idempotent. To achieve this, the manager component maintains an internal store of the desired switch state, only performing eAPI calls when the changes to the internal state are detected. To ease debugging and testing of the module, the internal state can be read through a custom resource and API endpoint of the Kubernetes cluster.

Packets that relate to Kubernetes events are prepended by the switch with a VXLAN header in order to maintain compatibility with other network devices and retain inner packet integrity. A host kernel driver solution is provided in the specific pod that handles events relating to configuration of the switch to remove the prepended header from the packet, recovering the original packet that was ingested by the switch.

The switch-specific pod that contains the host kernel driver may also make use of a dummy network interface that will serve the packets to an application. This application may be running in user space (referred to herein as "userland"). Such a userland application must bind to either a service IP address assigned by Kubernetes, or a wildcard address (0.0.0.0). The host kernel driver performs packet forwarding from the pod ingress interface (eth0) to the dummy interface. For packets transmitted by the userland application, no special packet handling is required, as the switch will act as a regular network switch receiving the packets.

In an alternative embodiment, Network Address Translation (NAT) is performed within the host kernel driver. This embodiment does not require a dummy network interface, and the application can bind to the Kubernetes pod IP address. This embodiment may not be preferred, as it adds additional network packet processing complexity with the host kernel driver that could lead to performance degradation under high load.

Figure 4:
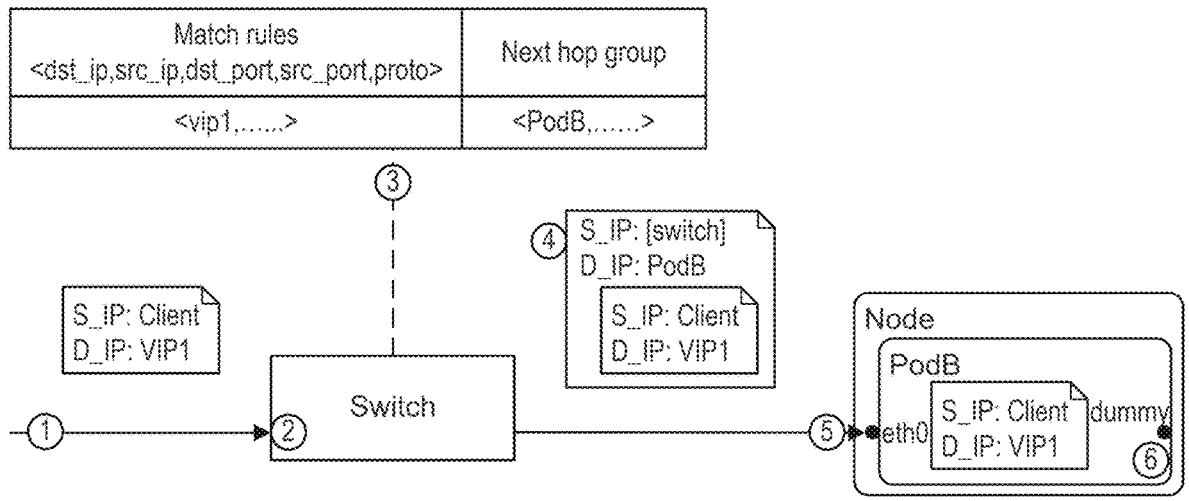
FIG. 4 is a diagram illustrating the steps taken by the switch to route a packet to a pod takes when the destination is a Kubernetes service in accordance with some embodiments.

Referring to FIG. 4, a diagram is shown to illustrate the steps taken by the switch to route a packet to a pod when the destination is a Kubernetes service. The diagram assumes that a dummy network interface is created within the pod.

Initially, an external client sends a packet to the Kubernetes service [1]. The packet is ingested by the switch [2], and the switch (e.g., using a load balancer profile) refers to a set of rules to identify a pod that matches the packet [3]. In this example, the packet has a destination IP field of VIP1, which is matched to Pod B. The switch therefore prepends a VXLAN header with the switch as the source IP and Pod B as the destination IP [4]. The packet transmitted to Kubernetes Pod B and is received on interface eth0 [5]. The host kernel driver of the pod removes the VXLAN header and outputs the packet on the dummy network interface [6]. The userland application then receives the original packet.

VXLAN headers are used in the handling of the packets for several reasons. As noted above, by prepending and then removing the VXLAN headers, the original packet is not modified. This also allows for Direct Server Reply (DSR) and network traceability. Using the VXLAN headers also removes the need to perform network address translation, both within the switch and at the Host. Further, the use of the VXLAN headers enables reliable Stateful L4 (e.g., TCP) session tracking, accommodating for addition or deletion of servers without interrupting established sessions when the connection tracking feature is enabled. Finally, use of VXLAN headers can allow direct forwarding of packets to Kubernetes pods under specific circumstances (e.g., when the pod IP is routable outside the cluster, CNI is compliant, etc.), which eliminates the need to perform node-local routing.

Figure 5:
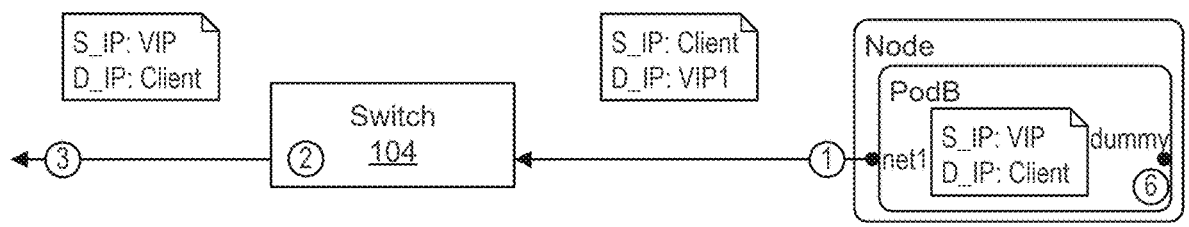
FIG. 5 is a diagram illustrating the steps that a packet takes when originating from a pod belonging to a Kubernetes service in accordance with some embodiments.

Referring to FIG. 5, a diagram is shown to illustrate the steps that a packet takes when originating from a pod belonging to a Kubernetes service. The diagram assumes that a dummy network interface is created within the pod.

In the illustrated process, a userland application generates a packet which is destined for a client [1]. The source IP of the packet is the IP of the Kubernetes service. The packet traverses the switch without modification (the switch works as a regular network switch) [2]. The packet is transmitted to the client from the switch using standard routing methods [3].

Figure 6:
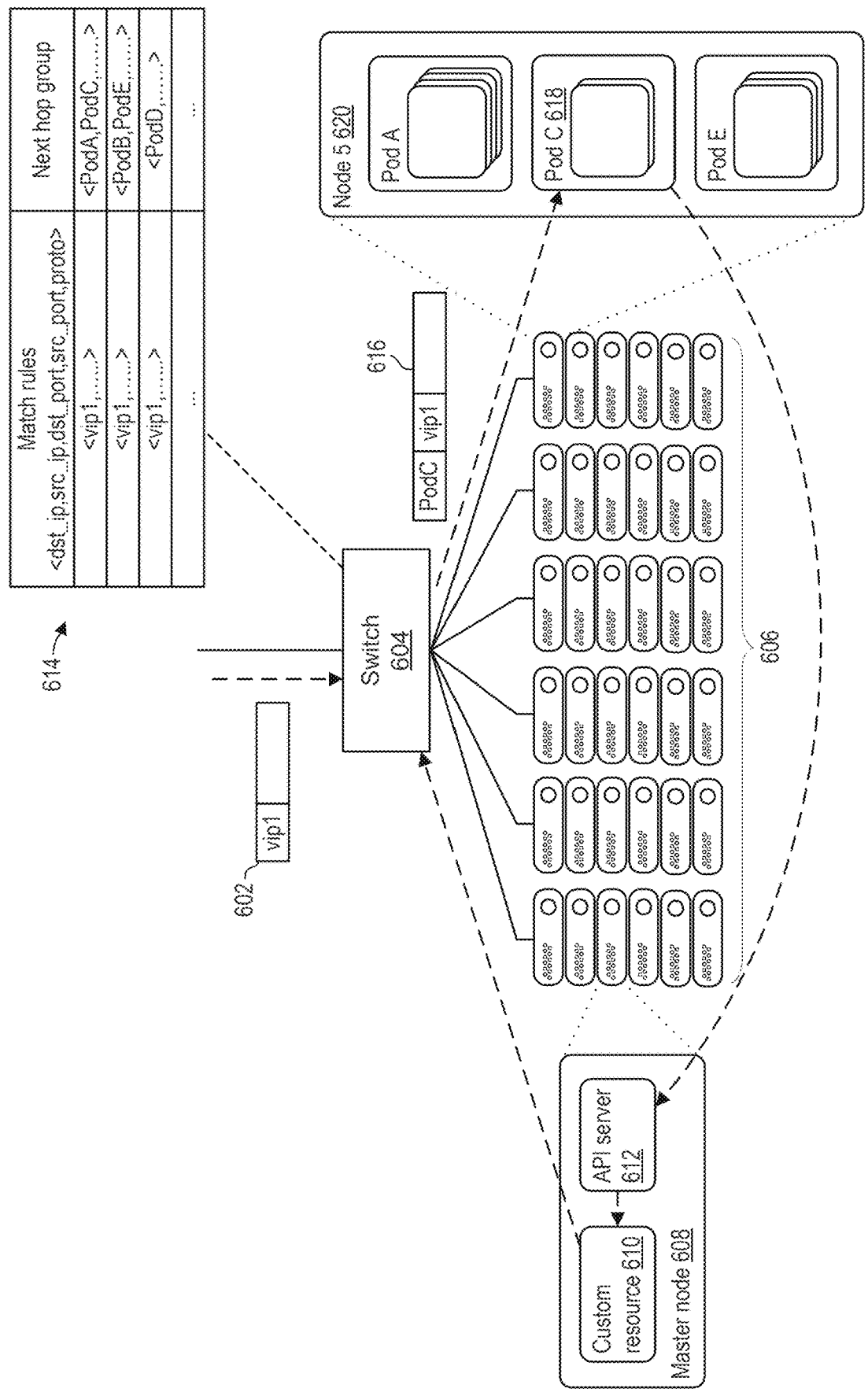
FIG. 6 is a diagram illustrating an example of the modification of network switch hardware using a hardware accelerated Kubernetes architecture in accordance with some embodiments.

Referring to FIG. 6, a diagram is provided to illustrate an example of the modification of network switch hardware using a hardware accelerated Kubernetes architecture. In this example, an original packet 602 which is destined for a Kubernetes service is received by a network switch 604 from a network fabric. Network switch 604 is a load balancing switch which is configured to distribute received network traffic among Kubernetes pods that are contained in a Kubernetes cluster executing on one or more servers 606 connected to the switch. The configuration of switch 604 is capable of being modified by API calls received from a custom resource 610 of the Kubernetes architecture on a master node 608 connected to the switch.

It should be noted that, although in this particular example the switch is configured to perform load balancing of the network traffic received for the Kubernetes service and the custom resource modifies the configuration of the switch's load balancing profile, alternative embodiments may modify other aspects of the switch's hardware configuration (e.g., attachment to a VLAN, inclusion in a route advertisement, etc.) In still other alternative embodiments, the custom resource of the Kubernetes controller may modify hardware components other than a new switch. For example, firewall hardware appliances can be configured to prevent misuse, network workload inspectors (deep packet inspectors, or DPI) can be leveraged for workload federation and inspection, identity descriptors can be programmed to classify workload traffic, etc.

Referring again to FIG. 6, when original packet 602 is received by switch 604, custom resource 610 on master node 608 compares received packet 602 to a set of rules 614 that are maintained by the custom resource to determine whether it relates to a Kubernetes event. If the packet relates to a Kubernetes event, the custom resource identifies a match for the packet based on the destination IP of the packet. In this example, packet 602 has a destination IP of vip1, which matches the first entry in table 614. This entry identifies Pod A and Pod C as the next hop for the packet. The custom resource therefore selects one of these pods (in this example, Pod C) to which the packet will be sent.

If a Kubernetes pod has been identified for the packet, a header is prepended to the packet to identify the destination pod. In the example of FIG. 6, a header (e.g., a VXLAN header) identifying Pod C as the destination IP is prepended to the original packet, resulting in packet 616. Packet 616 Is then delivered from switch 604 to Pod C (618), which is on Kubernetes node 5 (620).

Pod C removes the prepended VXLAN header to obtain the original packet and processes this packet. Based on the processing of the packet, Pod C may determine that the configuration of switch 604 may be affected. In this case, Pod C generates an API call to API server 612 in master node 610. If the API call requires a change in the configuration of the switch (e.g., if the load balancing performed by the switch needs to be modified), custom resource 608 of master node 610 generates a corresponding API call to the switch. This API call is made to switch 604 to modify the configuration of the switch.

Thus, the hardware configuration of the switch is modified directly by the action of the Kubernetes service without the intervention of a user, accelerating the configuration update.

Figure 7:
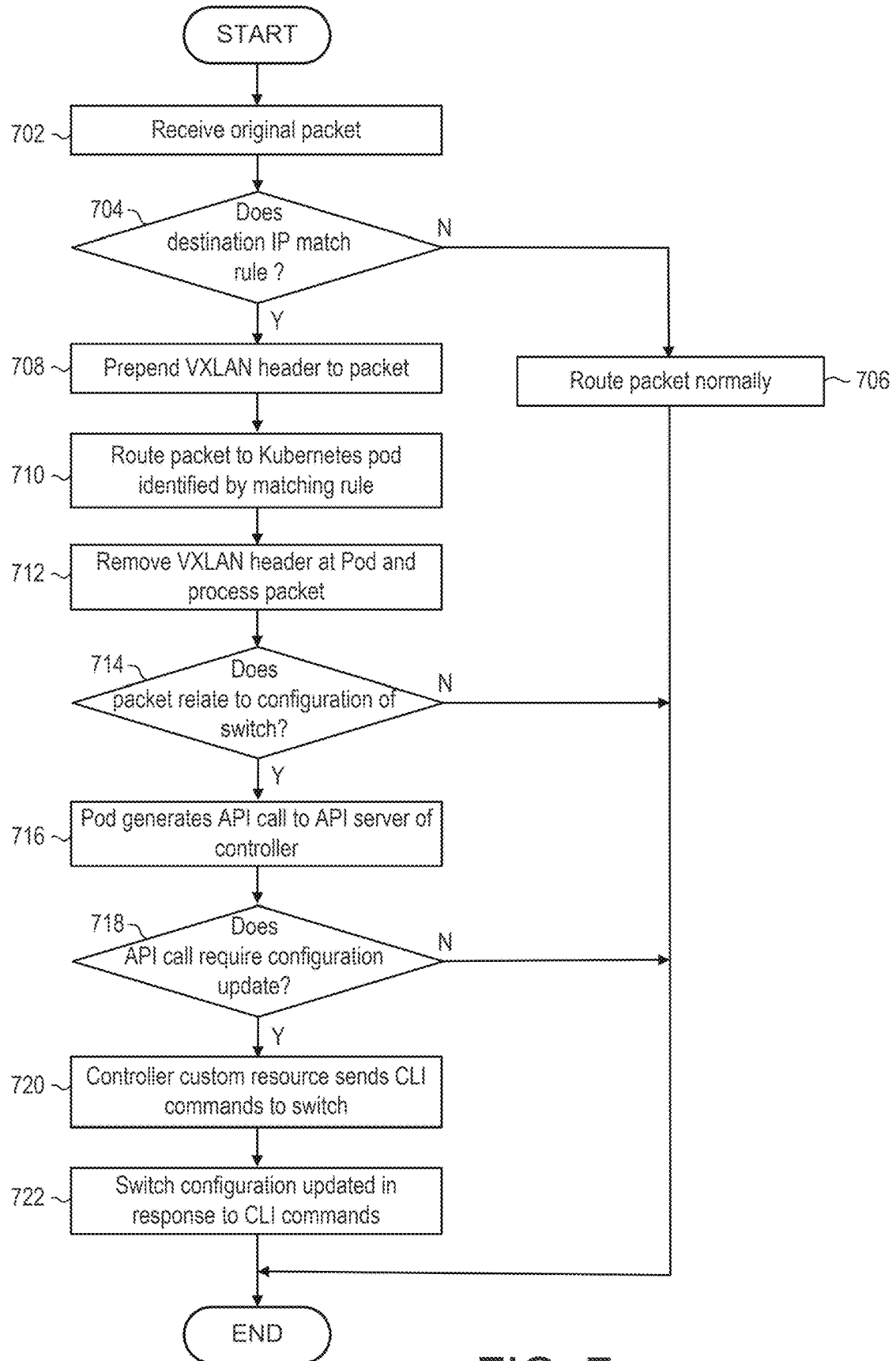
FIG. 7 is a flow diagram illustrating a method in accordance with the example of FIG. 6.

The example of FIG. 6 is reflected in the flow diagram of FIG. 7. Such a method can be performed, at least in part, utilizing a master node in a Kubernetes architecture, or a controller or another custom resource thereon. As shown in this figure, an original packet is received from a source on a network (step 702). At step 704, a Kubernetes controller compares the destination IP of the original packet to a set of rules to determine whether any of the rules match the destination IP. If the destination IP does not match any of the rules, the packet does not relate to a Kubernetes event, and the packet is routed normally to the destination IP (step 706).

If the destination IP matches one of the rules, the packet relates to a Kubernetes event, so a VXLAN header is prepended to the packet (step 708), where the header specifies as a destination the Kubernetes pod identified in the rule that matches the original packet destination IP. Then, at step 710, the packet with the prepended header is forwarded to the Kubernetes pod identified as the destination in the prepended header.

At step 712, when the packet with the prepended header is received by the Kubernetes pod, the prepended header is removed, so that the original packet remains, and the original packet is processed by the pod. At step 714, if the packet does not relate to the configuration of the switch, no action needs to be taken with respect to the switch, so the process ends. If, on the other hand, the packet does relate to the configuration of the switch, the pod generates an API call to the API server of the Kubernetes controller to indicate a desired configuration or modification of the switch (step 716).

At step 718, the Kubernetes controller determines whether it is necessary to update the configuration of the switch based on the API call from the pod. If the switch is already appropriately configured, then there is no need to modify the switch configuration, so the process ends. If the API call requires a change to the current switch configuration, the process proceeds to step 720, and the custom resource of the controller generates one or more CLI commands which are sent to the switch. Then at step 722 the switch modifies its configuration in response to the received CLI commands from the controller.

Thus, the process of FIG. 7 enables the integration of the software processes that are implemented using the Kubernetes architecture with network hardware so that the network hardware can be affected or controlled by the Kubernetes processes without any user intervention. The integration of the Kubernetes processes with the network hardware thereby accelerates the control of the hardware in comparison to conventional techniques in which the Kubernetes processes cannot directly affect network hardware components and user intervention is required to control or modify the hardware components.

Although specific embodiments have been described above, numerous alternative embodiments having variations from the foregoing description will be apparent to those skilled in the art. For example, as noted above, while the foregoing embodiments involve the modification of the configuration of a network switch, the described Kubernetes architecture may update the configurations of various other types of network hardware or may interact with the network elements to affect other features of these elements via corresponding API calls from the Kubernetes architecture components to the network elements. Further, although the foregoing description focuses on the modification of a load balancing profile of a network switch, the Kubernetes architecture may modify or otherwise affect other features of the switch or other network elements. Further, management and orchestration frameworks other than a Kubernetes architecture may be used. Still further, while the Kubernetes architecture in the embodiments described above modify the configuration of the switch via API calls from the Kubernetes controller to the switch, the controller may send CLI commands to the switch to modify its configuration. Numerous other variations may also be made in alternative embodiments.

Examples of alternative embodiments may include a method for Kubernetes-cluster-driven modification of network hardware configuration. In this method, a Kubernetes event is detected in received network traffic and the network traffic associated with the Kubernetes event is forwarded to a controller of a Kubernetes cluster for processing. Based on the processing of the event, a modification of a configuration of a network hardware element is determined and the controller generates a command to the network hardware element to implement the desired modification. The configuration of the network element is then updated according to the command received from the controller.

In some embodiments, the command comprises an API call, while in other embodiments the command comprises a CLI command.

In some embodiments, the network traffic is received at a network switch. The network element may comprise this network switch and the modification may comprise modifying the load balancing functions on the network switch. The method may alternatively comprise modifying load balancing functions of other network elements. The Kubernetes cluster may comprise nodes that are running on physical servers that are connected to the network switch, where the nodes may be distributed across multiple physical servers and the multiple physical servers may be connected to multiple network switches.

The network switch may compare the event associated with the network traffic to a set of match rules and determine a Kubernetes pod based on the match rules, where the event is then forwarded to the pod. The method may further include the network switch identifying a service associated with the event and identifying the Kubernetes pod as one of a set of Kubernetes pods running the identified service.

Another alternative embodiment may comprise a system for acceleration of network functions, where the system comprises one or more network elements, one or more servers connected to the network elements, a Kubernetes controller running on the one or more servers, and one or more Kubernetes services running on the one or more servers. The Kubernetes controller is configured to receive network traffic associated with a Kubernetes event, determine a modification of a configuration of the network elements based on the processing of the network traffic, and send one or more configuration commands to the network elements. The one or more network elements are configured to then modify their respective configurations in response to receiving the configuration commands from the Kubernetes controller.

In some embodiments, the Kubernetes controller is configured to determine the modification of the configuration of the one or more network elements by identifying a Kubernetes service to which the network traffic is destined, send the network traffic to a Kubernetes pod associated with the identified Kubernetes service, and receive an indication of the modification of the configuration of the one or more network elements from the Kubernetes pod. Receiving the indication of the modification of the configuration of the network elements may comprise receiving an API call from the Kubernetes pod. Identifying the Kubernetes service to which the network traffic is destined may comprise comparing the network traffic to a set of match rules, identifying one of the rules matching a destination IP of the network traffic, and identifying the Kubernetes pod in the one of the rules matching the destination IP of the network traffic.

In some embodiments, the network elements of the system may comprise a switch from which the Kubernetes controller receives the network traffic. The switch may be configured to perform load balancing of the network traffic.

Yet another alternative embodiment may be a computer program product comprising a non-transitory computer-readable medium storing instructions executable by one or more processors to perform a method that includes detecting a Kubernetes event in received network traffic, forwarding the network traffic associated with the Kubernetes event to a controller of a Kubernetes cluster for processing, determining a modification of a configuration of a network hardware element based on the processing of the event, generating and sending a command to the network hardware element to implement the desired modification, and updating the configuration of the network element according to the command.

In some embodiments, forwarding the network traffic associated with the Kubernetes event to the controller may comprise the controller comparing the network traffic associated with the Kubernetes event to a set of match rules and determining a Kubernetes pod based on the match rules, where the network traffic associated with the Kubernetes event is forwarded to the Kubernetes pod, and identifying a Kubernetes service associated with the event where the identified Kubernetes pod is one of the Kubernetes pods running the identified Kubernetes service. In some embodiments, determining the modification of the configuration of the network hardware element may comprise receiving an API call from the Kubernetes pod.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth herein.

What is claimed is:

1. A method for Kubernetes-cluster-driven modification of network hardware configuration, the method comprising:
   receiving network traffic associated with a Kubernetes event at a controller of a Kubernetes cluster for processing, wherein the network traffic was forwarded based on detection of the Kubernetes event in the network traffic;
   determining, based on the processing of the event, a modification of a configuration of a network hardware element; and
   generating, by the controller, a command to the network hardware element to implement the desired modification, wherein the command is adapted to cause an update to the configuration of the network element according to the command.

2. The method of claim 1, wherein the command comprises an API call.

3. The method of claim 1, wherein the command comprises a Command Line Interface (CLI) command.

4. The method of claim 1, further comprising receiving the network traffic at a network switch.

5. The method of claim 4, further comprising comparing, by the network switch, the event to a set of match rules and determining a Kubernetes pod based on the match rules, wherein the event is forwarded to the pod.

6. The method of claim 5, further comprising identifying, by the network switch, a service associated with the event and identifying the Kubernetes pod as one of a set of Kubernetes pods running the identified service.

7. The method of claim 5, wherein the network element comprises the network switch.

8. The method of claim 7, wherein the modification modifies load balancing functions on the network switch.

9. The method of claim 7, wherein the Kubernetes cluster comprises nodes that are running on physical servers that are connected to the network switch.

10. The method of claim 9, wherein the Kubernetes cluster comprises nodes that are distributed across multiple physical servers.

11. The method of claim 10, wherein the multiple physical servers are connected to multiple network switches.

12. The method of claim 1, wherein the modification modifies load balancing functions on the network element.

13. A system for acceleration of network functions, the system comprising:
- one or more network elements;
- one or more servers connected to the network elements;
- a Kubernetes controller running on the one or more servers; and
- one or more Kubernetes services running on the one or more servers;
- wherein the Kubernetes controller is configured to
  - receive network traffic associated with a Kubernetes event,
  - determine, based on the processing of the network traffic, a modification of a configuration of the one or more network elements, and
  - send one or more configuration commands to the one or more network elements; and
- wherein the one or more network elements are configured to, in response to receiving the one or more configuration commands from the Kubernetes controller, modify the configuration of the one or more network elements.

14. The system of claim 13, wherein the Kubernetes controller is configured to determine the modification of the configuration of the one or more network elements by identifying a Kubernetes service to which the network traffic is destined, send the network traffic to a Kubernetes pod associated with the identified Kubernetes service, and receive an indication of the modification of the configuration of the one or more network elements from the Kubernetes pod.

15. The system of claim 14, wherein receiving the indication of the modification of the configuration of the one or more network elements comprises receiving an API call from the Kubernetes pod.

16. The system of claim 14, wherein identifying the Kubernetes service to which the network traffic is destined comprises comparing the network traffic to a set of match rules and identifying one of the rules matching a destination IP of the network traffic, and identifying the Kubernetes pod in the one of the rules matching the destination IP of the network traffic.

17. The system of claim 13, wherein the one or more network elements comprise a switch from which the Kubernetes controller receives the network traffic.

18. The system of claim 17, wherein the switch is configured to perform load balancing of the network traffic.

19. A computer program product comprising a non-transitory computer-readable medium storing instructions executable by one or more processors to perform:
- detecting a Kubernetes event in received network traffic;
- forwarding the network traffic associated with the Kubernetes event to a controller of a Kubernetes cluster for processing;
- determining, based on the processing of the event, a modification of a configuration of a network hardware element;
- generating, by the controller, a command to the network hardware element to implement the desired modification; and
- updating the configuration of the network element according to the command.

20. The computer program product of claim 19:
- wherein forwarding the network traffic associated with the Kubernetes event to the controller comprises
  - comparing, by the controller, the network traffic associated with the Kubernetes event to a set of match rules and determining a Kubernetes pod based on the match rules, wherein the network traffic associated with the Kubernetes event is forwarded to the Kubernetes pod, and
  - identifying, by the controller, a Kubernetes service associated with the event and identifying the Kubernetes pod as one of a set of Kubernetes pods running the identified Kubernetes service;
- wherein determining the modification of the configuration of the network hardware element comprises receiving an API call from the Kubernetes pod.

* * * * *